United States Patent
Kim et al.

(10) Patent No.: US 9,616,478 B2
(45) Date of Patent: Apr. 11, 2017

(54) BENDING APPARATUS AND BENDING METHOD USING THE SAME

(71) Applicant: SAMSUNG DISPLAY CO., LTD., Yongin, Gyeonggi-Do (KR)

(72) Inventors: Tae Woong Kim, Yongin (KR); Young Ki Hong, Yongin (KR); Hyun Woo Koo, Yongin (KR); Young Gug Seol, Yongin (KR)

(73) Assignee: Samsung Display Co., Ltd., Yongin-si (KR)

( * ) Notice: Subject to any disclaimer, the term of this patent is extended or adjusted under 35 U.S.C. 154(b) by 418 days.

(21) Appl. No.: 14/014,175

(22) Filed: Aug. 29, 2013

(65) Prior Publication Data

US 2014/0305180 A1     Oct. 16, 2014

(30) Foreign Application Priority Data

Apr. 11, 2013    (KR) ........................ 10-2013-0040004

(51) Int. Cl.
| | |
|---|---|
| *B29C 53/02* | (2006.01) |
| *B21D 11/02* | (2006.01) |
| *B29C 53/04* | (2006.01) |
| *G06F 1/16* | (2006.01) |

(52) U.S. Cl.
CPC .............. *B21D 11/02* (2013.01); *B29C 53/04* (2013.01); *G06F 1/1652* (2013.01)

(58) Field of Classification Search
CPC ......... B29C 53/00; B29C 53/02; B29C 53/04; B29C 53/063; B29C 53/38; B29C 53/385; B29C 53/48; B21D 11/02; B21D 25/00–25/04; B29D 11/00788

USPC ........ 156/196, 200, 212; 264/292, 295, 296; 425/385, 388, 404, 469
See application file for complete search history.

(56) References Cited

U.S. PATENT DOCUMENTS

| | | | | |
|---|---|---|---|---|
| 1,692,033 | A * | 11/1928 | Gray ...................... | B21D 53/00 221/261 |
| 3,768,294 | A * | 10/1973 | Van Dijk ............... | B21D 13/02 72/307 |
| 4,698,995 | A * | 10/1987 | Chorneau .............. | B21D 25/02 72/297 |
| 6,592,795 | B2 * | 7/2003 | Kasai ...................... | B29C 70/50 425/328 |

(Continued)

FOREIGN PATENT DOCUMENTS

| | | | |
|---|---|---|---|
| JP | 07195509 | * | 8/1995 |
| JP | 2010-137499 | * | 6/2010 |

(Continued)

*Primary Examiner* — Joseph S Del Sole
*Assistant Examiner* — Thukhanh T Nguyen
(74) *Attorney, Agent, or Firm* — Lewis Roca Rothgerber Christie LLP

(57) ABSTRACT

Provided are a bending apparatus and a bending method. According to an aspect of the present invention, there is provided a bending apparatus including a guide portion configured to guide a movement and a bending of a flexible substrate so that the flexible substrate is bent and moved, a first fastening portion configured to fix one side of the flexible substrate that is bent along the guide portion, a second fastening portion configured to fix an other side of the flexible substrate, and a driving portion configured to move at least one of the first fastening portion and the second fastening portion.

16 Claims, 13 Drawing Sheets

(56) References Cited

U.S. PATENT DOCUMENTS

| | | | |
|---|---|---|---|
| 6,743,390 B2* | 6/2004 | Yu | B29C 71/0072 |
| | | | 264/345 |
| 7,141,199 B2* | 11/2006 | Sana | B29C 70/345 |
| | | | 264/255 |
| 2012/0038613 A1 | 2/2012 | Choi | |

FOREIGN PATENT DOCUMENTS

| KR | 10-2009-0097019 A | 9/2009 |
|---|---|---|
| KR | 10-2010-0037879 A | 4/2010 |
| KR | 10-2011-0072699 | 6/2011 |

* cited by examiner

BENDING APPARATUS AND BENDING METHOD USING THE SAME

CROSS-REFERENCE TO RELATED APPLICATION

This application claims priority to and the benefit of Korean Patent Application No. 10-2013-0040004, filed on Apr. 11, 2013 in the Korean Intellectual Property Office, the disclosure of which is expressly incorporated herein in its entirety by reference.

BACKGROUND

1. Field

The present invention relates to a bending apparatus and a bending method using the same.

2. Description of the Prior Art

The display market has rapidly changed to aim for flat panel displays (FPD) which can be large-sized, lightweight, and thin-filmed. Such flat panel displays include liquid crystal displays (LCD), plasma display panels (PDP), and organic light emitting displays (OLED). Because the existing liquid crystal displays, plasma display panels, and organic light emitting displays use glass substrates, they have low flexibility and are limited in application and use.

Accordingly, flexible displays, which are fabricated to be bent, using substrates made of flexible materials, such as plastic, foil, or the like, instead of a glass substrate, have been actively developed as next-generation displays.

Further, along with the development of flexible displays, there is now a demand for various devices for evaluating or fabricating flexible substrates or flexible panels having flexibility.

SUMMARY

Aspects of the present invention are directed to providing a bending apparatus which can evaluate bending characteristics of various regions of a substrate.

Additionally, another aspect of the present invention is directed to providing a bending method which can evaluate bending characteristics of various regions of a substrate.

Additional aspects, subjects, and features of the invention will be set forth in part in the description which follows, and in part will become apparent to those having ordinary skill in the art upon examination of the following or may be learned from practice of the invention.

According to an aspect of the present invention, there is provided a bending apparatus including: a guide portion configured to guide a movement and a bending of a flexible substrate so that the flexible substrate is bent and moved; a first fastening portion configured to fix one side of the flexible substrate that is bent along the guide portion; a second fastening portion configured to fix an other side of the flexible substrate; and a driving portion configured to move at least one of the first fastening portion and the second fastening portion.

The guide portion may include a cylindrical guide rod, and the flexible substrate is bent to be in contact with the guide rod.

A bending region may be formed on the flexible substrate as the one side and the other side of the flexible substrate fastened to the first fastening portion and the second fastening portion, respectively, is bent along the guide portion including a cylindrical guide rod.

The bending region may include a first bending line on one side of the bending region and a second bending line on the other side of the bending region, wherein a sum of a first distance extending from the one side of the flexible substrate to the first bending line and a second distance extending from the other side of the flexible substrate to the second bending line is constant.

The first distance and the second distance may be configured to have a same initial state, and in the initial state, a third distance extending from the one side of the flexible substrate to the other side of the flexible substrate is equal to a diameter of the guide rod.

The first distance and the second distance may be configured to have a same initial state, and in the initial state, a third distance extending from the one side of the flexible substrate to the other side of the flexible substrate is larger than a diameter of the guide rod.

The first distance and the second distance may be configured to have a same initial state, and in the initial state, a third distance extending from the one side of the flexible substrate to the other side of the flexible substrate is smaller than a diameter of the guide rod.

The bending region of the flexible substrate may be shifted as the first fastening portion or the second fastening portion is moved by the driving portion.

A first guide rod and a second guide rod may be configured to rotate as the first fastening portion or the second fastening portion moves.

The flexible substrate may include an active region and a dummy region that is arranged along a circumference of the active region, and the first fastening portion and the second fastening portion are fastened to the flexible substrate at the dummy region.

The guide portion may include a first guide rod and a second guide rod, each having a cylindrical shape, and wherein the flexible substrate is bent to be in at least partial contact with the first guide rod and the second guide rod.

The flexible substrate may be bent in an "u" shape by the first guide rod and the second guide rod.

The flexible substrate may be bent in a "s" shape by the first guide rod and the second guide rod.

A first bending region may be formed in a portion where the flexible substrate and the first guide rod are in contact with each other and a second bending region is formed in a portion where the flexible substrate and the second guide rod are in contact with each other as the one side and the other side of the flexible substrate that is bent along the first guide rod and the second guide rod are configured to be fastened to the first fastening portion and the second fastening portion.

The first bending region and the second bending region may be shifted as the first fastening portion or the second fastening portion is moved by the driving portion.

According to another aspect of the present invention, there is provided a bending apparatus including: a cylindrical guide rod; a first fastening clamp spaced apart from the cylindrical guide rod and configured to perform perspective motion around the guide rod; and a second fastening clamp spaced apart from the guide rod and configured to perform perspective motion around the guide rod, wherein the first fastening clamp and the second fastening clamp are arranged to face each other, and the first fastening clamp and the second fastening clamp are configured to move in association with each other.

According to a further aspect of the present invention, there is provided a method for bending a flexible substrate, including: positioning the flexible substrate in close contact with a guide portion that guides bending of the flexible substrate; fastening one side and the other side of the flexible substrate that is bent along the guide portion to a first fastening portion and a second fastening portion; and moving the first fastening portion or the second fastening portion.

The flexible substrate may include a bending region that is formed by the guide portion and the first and second fastening portions, and the bending region is shifted as the first fastening portion or the second fastening portion moves.

BRIEF DESCRIPTION OF THE DRAWINGS

The above and other aspects and features of the present invention will be more apparent from the following detailed description taken in conjunction with the accompanying drawings, in which.

DETAILED DESCRIPTION

Figure 1:
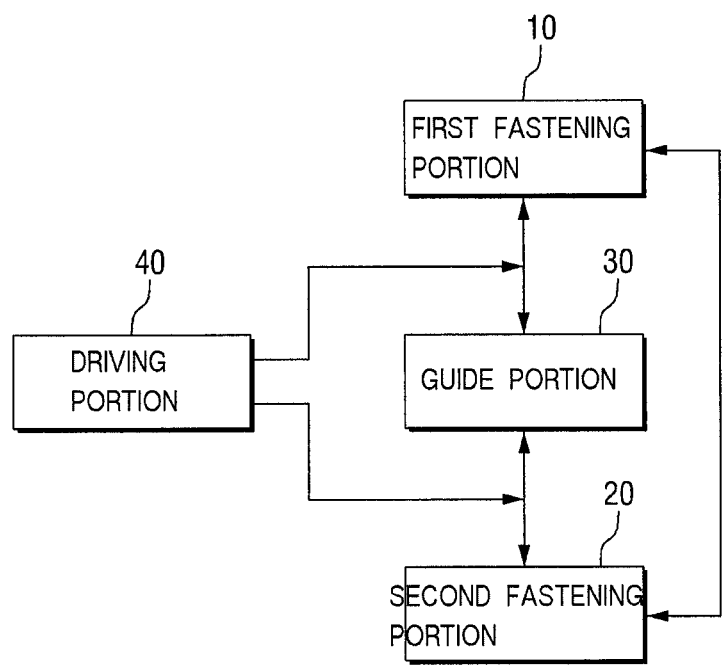
FIG. 1 is a block diagram of a bending apparatus, according to some example embodiments of the present invention.

The embodiments and features of the present invention and methods for achieving the embodiments and features will be apparent by referring to the embodiments to be described in detail with reference to the accompanying drawings. However, the present invention is not limited to the embodiments disclosed hereinafter, but can be implemented in various suitable forms. The matters defined in the description, such as the detailed construction and elements, are nothing but specific details provided to assist those of ordinary skill in the art in a comprehensive understanding of the invention, and the present invention is only defined within the scope of the appended claims.

As used herein, the term "on" or "above" may be used for ease of description to describe the relationship of one element to another element (or to other elements) as illustrated in the figures. The term "on" or "above" can be interpreted as "under" or "below" depending on the arrangement of elements or viewing angle.

The term "on" that is used to designate that an element is on another element or located on a different layer or a layer includes both an embodiment where an element is located directly on another element or a layer and an embodiment where an element is located on another element via another layer or still another element. In the entire description of the present invention, the same drawing reference numerals are used for the same elements across various figures.

Although terms such as "first", "second", and so forth are used to describe different constituent elements, such constituent elements are not limited by the terms. The terms are used only to discriminate a constituent element from other constituent elements. Accordingly, in the following description, a first constituent element may also be a second constituent element.

The embodiments of the present invention and methods for achieving the embodiments will be apparent by referring to the embodiments to be described in detail with reference to the accompanying drawings. However, the present invention is not limited to the embodiments disclosed hereinafter, but can be implemented in various suitable forms. The matters defined in the description, such as the detailed construction and elements, are nothing but specific details provided to assist those of ordinary skill in the art in a comprehensive understanding of the invention, and the present invention is only defined within the scope of the appended claims and equivalents thereof.

Hereinafter, example embodiments of the present invention will be described in detail with reference to the accompanying drawings.

FIG. 1 is a block diagram of a bending apparatus, according to some embodiments of the present invention.

Referring to FIG. 1, a bending apparatus 100, according to some embodiments of the present invention, includes a guide portion 30, guiding movement and bending of a flexible substrate so that the flexible substrate moves in a bent state; a first fastening portion 10, fixing one side of the flexible substrate that is bent along the guide portion 30; a second fastening portion 20, fixing the other side of the flexible substrate; and a driving portion 40, driving the first fastening portion 10 and the second fastening portion 20.

The guide portion 30 may come in contact with the flexible substrate to guide the bending of the flexible substrate. In an embodiment, the guide portion 30 guides (or helps determine) the bending shape and the bending region of the flexible substrate. For example, the guide portion 30 may include a cylindrical guide rod, and the flexible substrate may come in at least partial contact with the cylindrical rod. Accordingly, the bending of the flexible substrate can be guided (or facilitated). The side surface of the guide portion 30 may include a curved surface having a curvature (e.g., a predetermined curvature). In this case, the flexible substrate my come in contact with the curved surface of the guide portion 30 and may be bent depending on the shape of the curved surface.

In the description, the flexible substrate may be a substrate having flexibility characteristics, such as a base substrate, a substrate in which fine elements are formed, a substrate in which an indium tin oxide (ITO) and/or the like is formed as a transparent electrode, a film, a panel, or a window. The panel is a panel on which an image is displayed, and may include a liquid crystal display (LCD) panel, an electrophoretic Display Panel, an organic light emitting diode (OLED) panel, a light emitting diode (LED) panel, an organic electroluminescence (EL) display panel, a field emission display (FED) panel, a surface-conduction electron-emitter display (SED) panel, a plasma display panel (PDP), or a cathode ray tube (CRT). The flexibility characteristics may include all the flexibility, bending, and folding characteristics.

The first fastening portion 10 and the second fastening portion 20 may fix one side and the other side of the flexible substrate. As the one side and the other side of the flexible substrate that is bent along the guide portion 30 are fixed to the first fastening portion 10 and the second fastening portion 20, the flexible substrate that is bent by the guide portion 30 may be kept in a bent state. If the flexible substrate is kept in the bent state, the bending region of the flexible substrate may be defined as a portion where the flexible substrate and the guide portion 30 come in contact with each other.

In an example embodiment, the first fastening portion 10 and the second fastening portion 20 may be arranged to face each other. The first fastening portion 10 and the second fastening portion 20 may include a clamp for fastening the flexible substrate.

The driving portion 40 may move at least one of the first fastening portion 10 and the second fastening portion 20. The driving portion 40 may include a motor or an actuator.

Hereinafter, the operation of the bending apparatus, according to some embodiments of the present invention, will be described.

The driving portion 40 may drive the first fastening portion 10 and the second fastening portion 20 to perform perspective motion based on the guide portion 30. In the description, the term "perspective motion" may include motion whereby an object moves away from the base and motion whereby the object comes close to the base.

The first fastening portion 10 and the second fastening portion 20 may move in association with each other. In one embodiment, if the first fastening portion 10 that fastens one side of the flexible substrate moves, the second fastening portion 20 that fastens the other side of the flexible substrate may also move accordingly. For example, if the first fastening portion 10 moves away from the guide portion 30, the second fastening portion 20 comes close to the guide portion 30, while if the first fastening portion 10 comes close to the guide portion 30, the second fastening portion 20 moves away from the guide portion 30.

As in the example above, the motion of the second fastening portion 20 may similarly affect the motion of the first fastening portion 10.

If the first fastening portion 10 or the second fastening portion 20 moves, the bending region of the flexible substrate that is in contact with the guide portion 30 may be shifted. However, even in the case where the bending region is shifted, the area in which the flexible substrate and the guide portion 30 come in contact with each other, i.e., the area of the bending region may be kept constant.

Hereinafter, more detailed embodiments of the present invention will be described with reference to the drawings.

Figure 2:
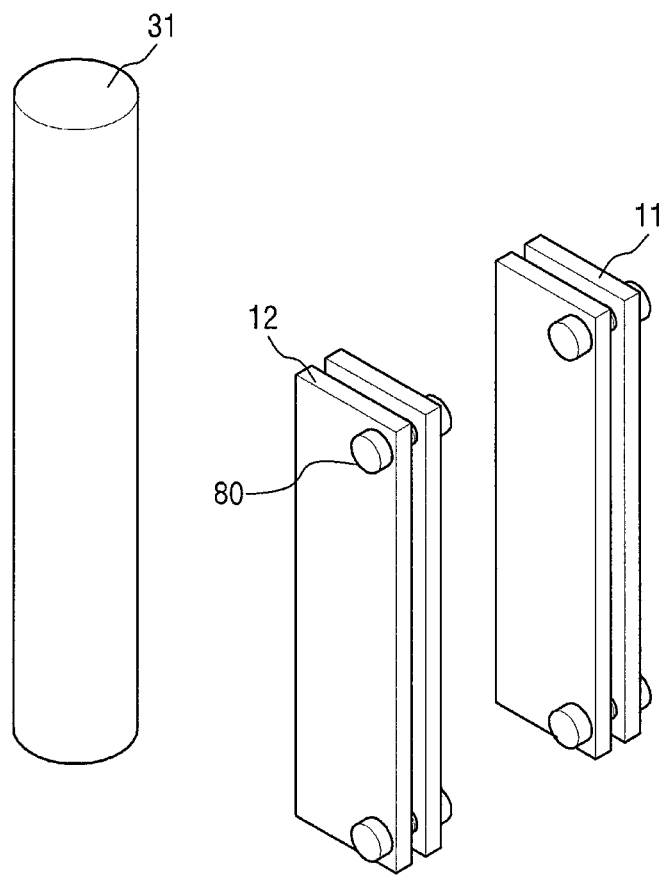
FIG. 2 is a perspective view of a bending apparatus, according to an example embodiment of the present invention.

FIG. 2 is a perspective view of a bending apparatus, according to an embodiment of the present invention.

Referring to FIG. 2, a bending apparatus 101, according to this embodiment of the present invention includes a guide rod 31, a first fastening clamp 11 and a second fastening clamp 12, which are spaced apart from the guide rod 31 at a distance (e.g., a predetermined distance), and a driving portion that moves the first fastening clamp 11 and the second fastening clamp 12.

The guide rod 31 may be in a cylindrical shape, and its longitudinal portion may be arranged, for example, vertically to ground. In the case where the guide rod 31 is arranged vertically to the ground, the transverse cross-section of the guide rod 31 may be in the form of a circle having a curvature (e.g., a predetermined curvature). However, the transverse cross-section of the guide rod 31 is not limited thereto, and may be a polygon or a shape that includes a curve at least partially. In the case where the transverse cross-section of the guide rode 31 is in the form of a circle having a curvature (e.g., a predetermined curvature), the side surface of the guide rod 31 may include a curved surface having a curvature (e.g., a predetermined curvature).

The first fastening clamp 11 and the second fastening clamp 12 may fasten one side and the other side of the flexible substrate. Screws 80 may be installed in the first fastening clamp 11 and the second fastening clamp 12 as means of fixing the flexible substrate. The screws 80 may be installed on the one side and the other side of the first fastening clamp 11 and the second fastening clamp 12, but the position and the number of screws 80 are not limited thereto. Further, the means for fixing the flexible substrate is not limited to the screw 80, and, for example, tongs may be adopted as the fixing means.

The first fastening clamp 11 and the second fastening clamp 12 may be arranged to face each other. In an example embodiment, an extension of the one side of the flexible substrate that is fastened by the first fastening clamp 11 may be substantially in parallel to an extension of the other side of the flexible substrate that is fastened by the second fastening clamp 12.

The driving portion may move the first fastening clamp 11 and/or the second fastening clamp 12. The driving portion may include a motor or an actuator.

In an example embodiment, the first fastening clamp 11 and/or the second fastening clamp 12 may perform perspective motion based on (e.g., around) the guide rod. In this case, the driving portion may further include a guide rail that guides the movement of the first fastening clamp 11 and/or the second fastening clamp 12.

Hereinafter, referring to FIGS. 3 and 4, the operation of a bending apparatus, according to an embodiment of the present invention, will be described.

Figure 3:
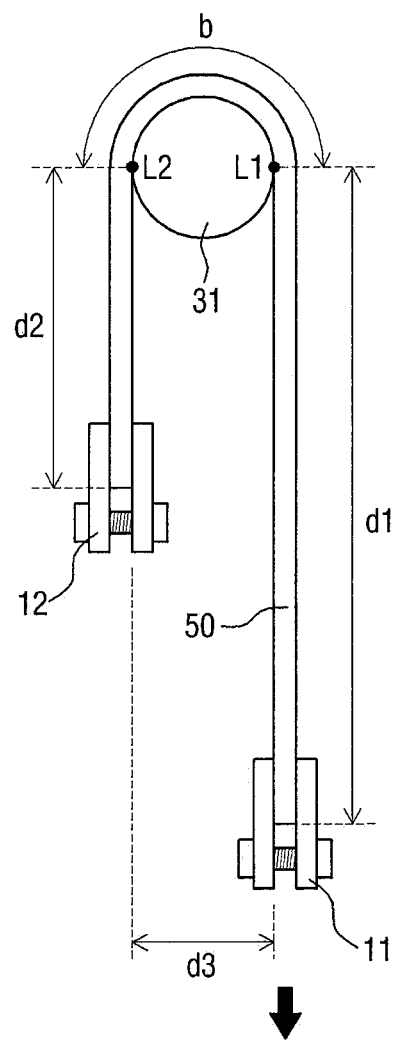
FIG. 3 is a plan view of a bending apparatus, according to an example embodiment of the present invention.
Figure 4:
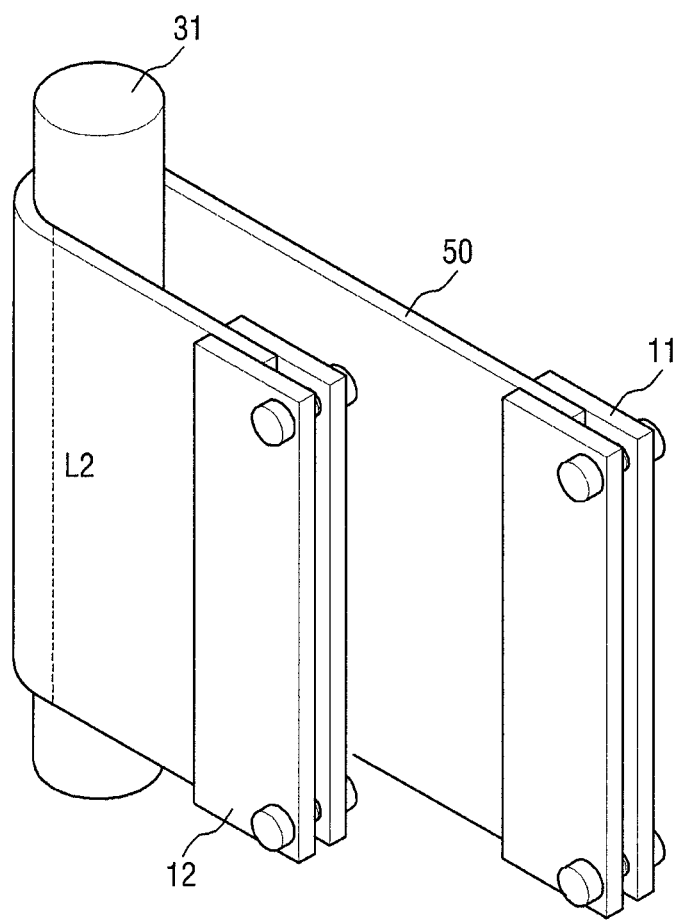
FIG. 4 is a perspective view of a bending apparatus, according to an example embodiment of the present invention.

FIG. 3 is a plan view of a bending apparatus, according to an embodiment of the present invention, and FIG. 4 is a perspective view of a bending apparatus, according to an embodiment of the present invention.

Referring to FIGS. 3 and 4, the driving portion may move the first fastening clamp 11 such that the sides of the first fastening clamp 11 and the second fastening clamp 12 are arranged to face each other.

As described above, the first fastening clamp 11 and/or the second fastening clamp 12 may perform perspective motion based on (e.g., around) the guide rod 31.

Further, the first fastening clamp 11 and the second fastening clamp 12 may move in association with each other. For example, if the first fastening clamp 11 moves away from the guide rod 31, the second fastening clamp 12 may come close to the guide rod 31.

The first fastening clamp 11 and the second fastening clamp 12 may perform linear motion, but are not limited thereto. The perspective motion of the first fastening clamp 11 and the second fastening clamp 12 may include a curvilinear motion.

As described above, as one side and the other side of a flexible substrate 50 that is bent along the guide rod 31 are fixed to the first fastening clamp 11 and the second fastening clamp 12, the flexible substrate 50 that is bent by the guide rod 31 may be kept in a bent state. If the flexible substrate 50 is kept in the bent state, a bending region b that corresponds to a bent portion of the flexible substrate may be defined as a portion where the flexible substrate 50 and the guide rod 31 come in contact with each other.

If the bending region b is defined as the portion where the flexible substrate 50 and the guide rod 31 come in contact with each other, two imaginary bending lines (shown as dashed lines) for dividing a flat region and the bending region b may be defined. For convenience of explanation, a bending line that is on one side of the bending region b is referred to as a first bending line L1, and a bending line that is on the other side of the bending region b is referred to as a second bending line L2.

Further, for convenience of explanation, an initial bending state is defined. The initial state means a state where a first distance d1 extending from one side of the flexible substrate 50 to the first bending line L1 is equal to a second distance d2 extending from the other side of the flexible substrate 50 to the second bending line L2. Further, a distance (or width of a gap) between the one side and the other side of the flexible substrate 50 in the initial state is defined as a third distance d3.

If the first fastening clamp 11 or the second fastening clamp 12 moves from the initial bending state, the bending region b may be shifted. For example, if the first fastening clamp 11 moves in a direction in which the first fastening clamp 11 moves away from the guide rod 31, the first distance d1 extending from the one side of the flexible substrate 50 to the first bending line L1 may increase, and the second distance d2 extending from the other side of the flexible substrate 50 to the second bending line L2 may decrease. However, the sum of the first distance d1 and the second distance d2 may be kept constant. Further, even in the case where the bending region b is shifted, the flexible substrate 50 moves in a state where the flexible substrate 50 is in close contact with the guide rod 31, and thus the area of the bending region b of the flexible substrate 50 may be kept constant.

In the examples of the foregoing description, the first fastening clamp 11 moves in the direction in which the first fastening clamp 11 goes away from the guide rod 31 and the second fastening clamp 12 moves in the direction in which the second fastening clamp 12 comes close to the guide rod 31. However, the second fastening clamp 12 may move in the direction in which the second fastening clamp 12 goes away from the guide rod 31 and the first fastening clamp 11 may move in the direction in which the first fastening clamp 11 comes close to the guide rod 31. In an example, it is apparent that the first distance d1 decreases and the second distance d2 increases.

The perspective motion of the first fastening clamp 11 or the second fastening clamp 12 may be intermittent or continuous, and may be repeatedly performed.

Hereinafter, other embodiments of the present invention will be described. In the following embodiments, the same reference numerals are used for the same constituents as described above, and repeat explanation thereof will not be provided.

Figure 5:
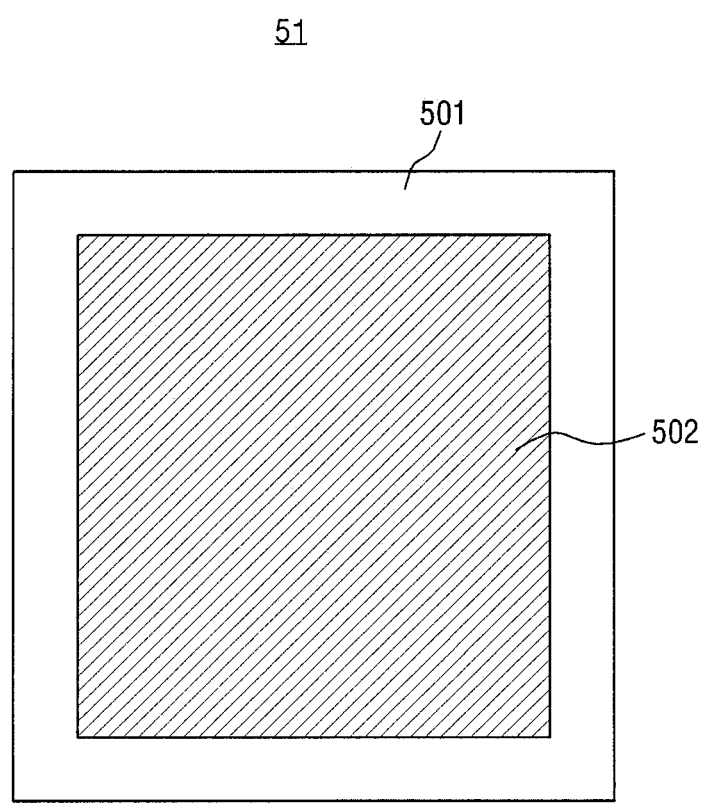
FIG. 5 is a plan view of a flexible substrate that is applied to a bending apparatus, according to another example embodiment of the present invention.
Figure 6:
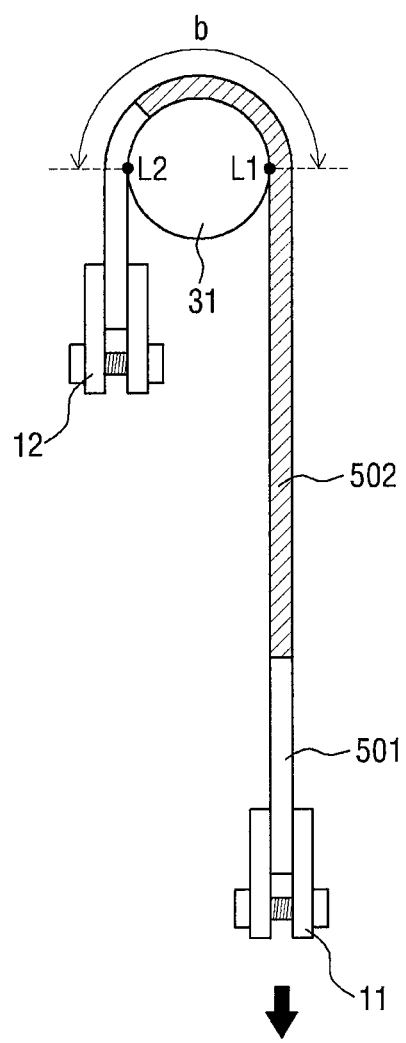
FIG. 6 is a cross-sectional view of a bending apparatus, according to another example embodiment of the present invention.

FIG. 5 is a plan view of another flexible substrate that is applied to a bending apparatus, according to another embodiment of the present invention, and FIG. 6 is a cross-sectional view showing the bending apparatus to which the flexible substrate of FIG. 5 is fastened.

Referring to FIGS. 5 and 6, a flexible substrate 51 is different from the flexible substrate illustrated in FIG. 3 in that the flexible substrate 51 includes an active region 502 and a dummy region 501 that is arranged along the circumference of the active region 502.

Fine elements may be formed in the active region 502 of the flexible substrate 51. For example, the flexible substrate 51 may be a substrate that includes organic light emitting elements. In the case where the flexible substrate 51 includes the organic light emitting elements, a semiconductor layer) may be positioned in the active region 502 of the flexible substrate 51. The semiconductor layer may be an amorphous silicon film or a polycrystalline silicon film that is obtained by crystallizing the amorphous silicon film. A gate insulating film that is a first insulating film is positioned on the semiconductor layer. A gate electrode that overlaps the semiconductor layer may be positioned on the gate insulating film. A second insulating film that covers the semiconductor layer and the gate electrode may be positioned on the gate electrode. A source electrode and a drain electrode, which are coupled (or connected) to both end portions of the semiconductor layer to penetrate the second insulating film and the first insulating film, may be positioned on the second insulating film.

The semiconductor layer, the gate electrode, and the source/drain electrodes constitute a thin film transistor. A third insulating film that covers the source/drain electrodes may be positioned on the source/drain electrodes. The third insulating film may be a passivation film for protecting the thin film transistor and/or a planarization film for mitigating the step height due to the thin film transistor. A pixel electrode that is electrically coupled (or connected) to the drain electrode to penetrate the third insulating film may be positioned on the third insulating film. The pixel electrode may be, for example, an indium tin oxide (ITO) film or an indium zinc oxide (IZO) film. A pixel defining film having an opening for exposing a part of the pixel electrode may be positioned on the pixel electrode.

The first fastening clamp 11 and the second fastening clamp 12 may be fastened to the dummy region 501 of the flexible substrate 51. In the embodiment in which the first fastening clamp 11 and the second fastening clamp 12 are fastened to the dummy region 501 of the flexible substrate 51, the whole active region 501 may be bent through driving of the first fastening clamp 11 or the second fastening clamp 12.

Figure 7:
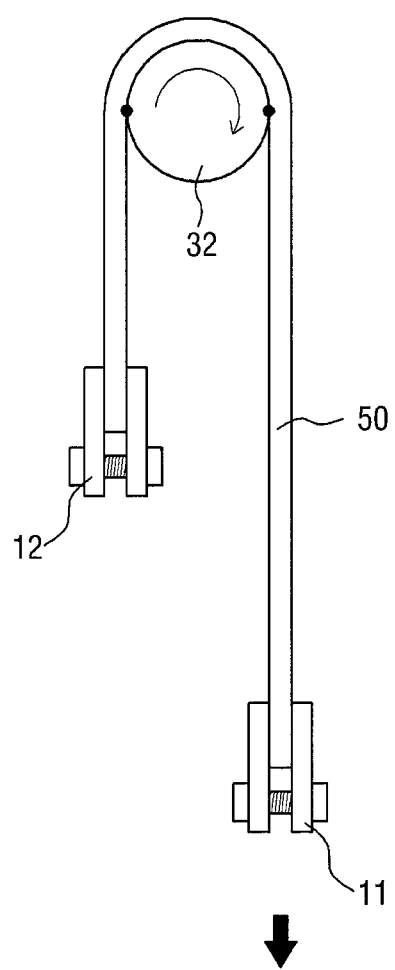
FIG. 7 is a cross-sectional view of a bending apparatus, according to another example embodiment of the present invention.

FIG. 7 is a cross-sectional view of a bending apparatus, according to another embodiment of the present invention.

Referring to FIG. 7, a guide rod 32 of a bending apparatus 102, according to this embodiment of the present invention, is different from the bending apparatus according to the embodiment of FIG. 3 in that the guide rod 32 is rotated as the flexible substrate 50 moves.

As described above, the first fastening clamp 11 and the second fastening clamp 12 may perform perspective motion based on (e.g., around) the guide rod 32. If the flexible substrate 50 moves along the circumference of the guide rod 32 due to the perspective motion of the first fastening clamp 11 and the second fastening clamp 12, the flexible substrate 50 may be rotated by a frictional force acting between the flexible substrate 50 and the guide rod 32. For example, if the first fastening clamp 11 moves in a direction in which the first fastening clamp 11 moves away from the guide rod 32, the flexible substrate 50 may move along the circumference of the guide rod 32, and thus the guide rod 32 may be rotated clockwise (see FIG. 7). By contrast, if the second fastening clamp 12 moves in a direction in which the second fastening clamp 12 moves away from the guide rod 32, the flexible substrate 50 may move along the circumference of the guide rod 32, and thus the guide rod 32 may be rotated clockwise.

To rotate the guide rod 32 of the bending apparatus 102, the bending apparatus 102 may further include rotating means for rotating the guide rod 32. For example, the rotating means may include a rotating shaft that extends in the lengthwise direction of the guide rod 32, but is not limited thereto.

If the guide rod 32 is rotated, the flexible substrate 50 can be prevented from being damaged through reduction of friction between the guide rod 32 and the flexible substrate 50.

Figure 8:
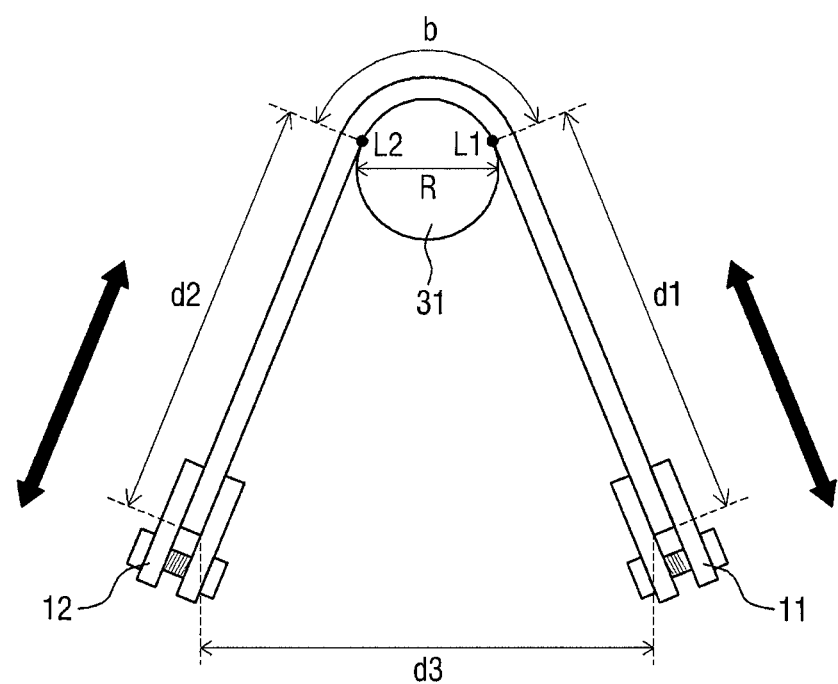
FIG. 8 is a cross-sectional view of a bending apparatus, according to another example embodiment of the present invention.

FIG. 8 is a cross-sectional view of a bending apparatus, according to another embodiment of the present invention.

Referring to FIG. 8, a bending apparatus 103 according to this embodiment of the present invention is different from the bending apparatus according to the embodiment of FIG. 3 in that a distance (a third distance d3) between one side and the other side of the flexible substrate 50 in the initial state is larger than a diameter R of the guide rod 31.

In the initial state, the distance d3 between the one side and the other side of the flexible substrate 50 may be larger than the diameter R of the guide rod 31. In this embodiment, a gap between the first bending line L1 and the second bending line L2 may be narrow in comparison to a case where the distance between the one side and the other side of the flexible substrate 50 is equal to the diameter R of the guide rod. Further, because the gap between the first bending line L1 and the second bending line L2 is narrowed, a smaller bending region b of the flexible substrate 50 may be formed in comparison to the bending apparatus 101, according to the embodiment of FIG. 3.

The operation of the bending apparatus 103, according to this embodiment of the present invention, may be substantially the same as the operation of the bending apparatus 101, according to an embodiment of the present invention, as described above. For instance, if the first fastening clamp 11 or the second fastening clamp 12 moves from the initial state, the bending region b may be shifted. If the first fastening clamp 11 moves in the direction in which the first fastening clamp 11 moves away from the guide rod 31, the first distance d1 extending from the one side of the flexible substrate 50 to the first bending line L1 may increase, and the second distance d2 extending from the other side of the flexible substrate 50 to the second bending line L2 may decrease. However, the sum of the first distance d1 and the second distance L2 may be kept constant. Further, even if the bending region b is shifted, the area of the bending area b of the flexible substrate 50 may be kept constant.

The first fastening clamp 11 and the second fastening clamp 12 may move in association with each other. For example, if the first fastening clamp 11 moves away from the guide rod 31, the second fastening clamp 12 may come close to the guide rod 31.

The first fastening clamp 11 and the second fastening clamp 12 may perform linear motion based on the guide rod 31 in a direction in which they come close to the guide rod 31 or in a direction in which they moves away from the guide rod 31 (see arrows in FIG. 8), but are not limited thereto. The perspective motion of the first fastening clamp 11 and the second fastening clamp 12 may partly include a curvilinear motion.

Figure 9:
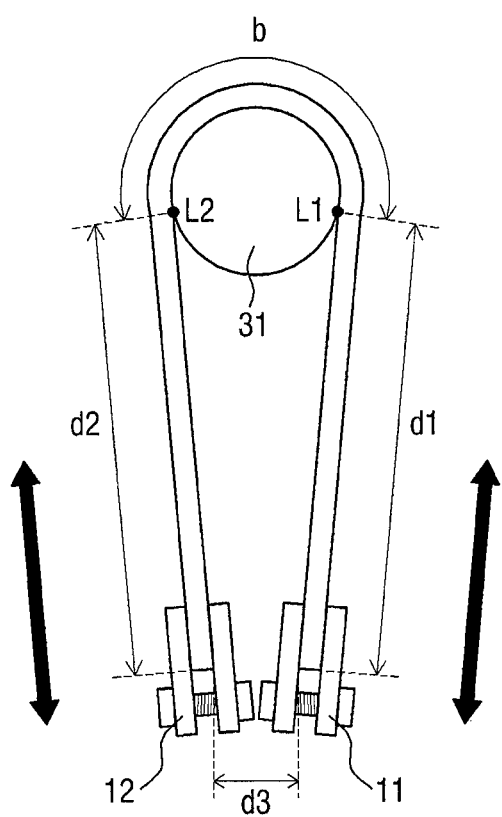
FIG. 9 is a cross-sectional view of a bending apparatus, according to another example embodiment of the present invention.

FIG. 9 is a cross-sectional view of a bending apparatus, according to another embodiment of the present invention.

Referring to FIG. 9, a bending apparatus 104, according to this embodiment of the present invention, is different from the bending apparatus according to the embodiment of FIG. 3 on the point that the distance (the third distance d3) between one side and the other side of the flexible substrate 50 in the initial state is smaller than the diameter R of the guide rod 31.

In the initial state, the distance d3 between the one side and the other side of the flexible substrate 50 may be smaller than the diameter R of the guide rod 31. In this case, the gap between the first bending line L1 and the second bending line L2 may be wide in comparison to a case where the distance between the one side and the other side of the flexible substrate 50 is equal to the diameter R of the guide rod. Further, because the gap between the first bending line L1 and the second bending line L2 is widened, a larger bending region b of the flexible substrate 50 may be formed in comparison to the bending apparatus 101 according to the embodiment of FIG. 3.

The operation of the bending apparatus 104, according to this embodiment of the present invention, may be substantially the same as the operation of the bending apparatus 101, according to an embodiment of the present invention, as described above. In one embodiment if the first fastening clamp 11 or the second fastening clamp 12 moves from the initial state, the bending region b may be shifted. For example, if the first fastening clamp 11 moves in the direction in which the first fastening clamp 11 moves away from the guide rod 31, the first distance d1 extending from the one side of the flexible substrate 50 to the first bending line L1 may increase, and the second distance d2 extending from the other side of the flexible substrate 50 to the second bending line L2 may decrease. However, the sum of the first distance d1 and the second distance L2 may be kept constant. Further, even if the bending region b is shifted, the area of the bending area b of the flexible substrate 50 may be kept constant.

The first fastening clamp 11 and the second fastening clamp 12 may move in association with each other. For example, if the first fastening clamp 11 moves away from the guide rod 31, the second fastening clamp 12 may come close to the guide rod 31.

The first fastening clamp 11 and the second fastening clamp 12 may perform linear motion based on the guide rod 31 in a direction in which they come close to the guide rod 31 or in a direction in which they move away from the guide rod 31 (see arrows in FIG. 9), but are not limited thereto. The perspective motion of the first fastening clamp 11 and the second fastening clamp 12 may partly include a curvilinear motion.

Figure 10:
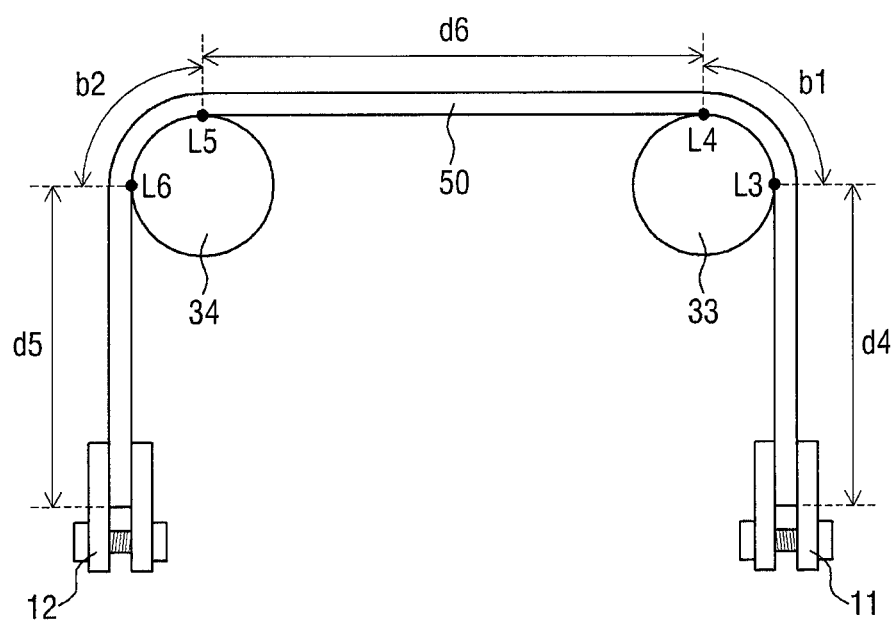
FIGS. 10 and 11 are cross-sectional views of a bending apparatus, according to another example embodiment of the present invention.
Figure 11:
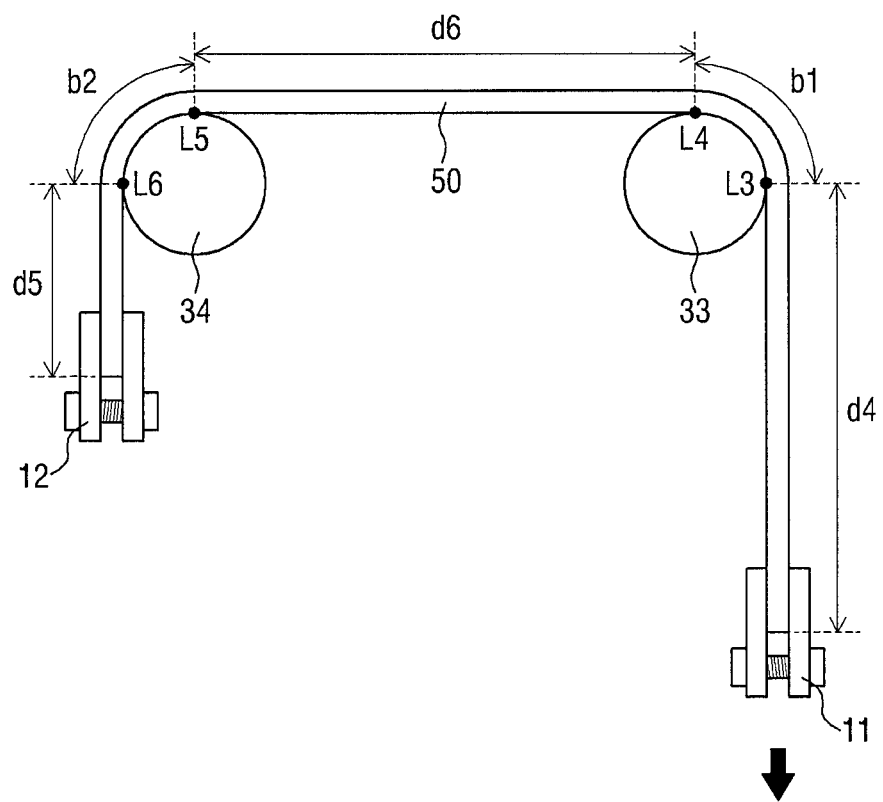

FIGS. 10 and 11 are cross-sectional views of a bending apparatus, according to another embodiment of the present invention.

Referring to FIGS. 10 and 11, a bending apparatus 105, according to this embodiment of the present invention, is different from the bending apparatus according to the embodiment of FIG. 3 in that the guide portion includes two guide rods 33 and 34.

The bending apparatus 105, according to this embodiment, may include two guide rods. For convenience of explanation, they are referred to as a first guide rod 33 and a second guide rod 34.

The first guide rod 33 and the second guide rod 34 may be in a cylindrical shape. The first guide rod 33 and the second guide rod 34 may be arranged vertically relative to ground. Further, the first guide rod 33 and the second guide rod 34 may be arranged to be spaced apart from each other for a distance (e.g., a predetermined distance) and to be substantially in parallel to each other. The transverse cross-sections of the first guide rod 33 and the second guide rod 34 may be in the form of a circle having a curvature (e.g., a predetermined curvature), but are not limited thereto. The transverse cross-sections of the first guide rod 33 and the second guide rod 34 may be a polygon or a shape that includes a curve at least partially. In the case where the transverse cross-sections of the first and second guide rods 33 and 34 are in the form of a circle having a curvature (e.g., a predetermined curvature), the side surfaces of the first and second guide rods 33 and 34 may include curved surfaces having a curvature (e.g., a predetermined curvature).

The flexible substrate 50 may be bent in a "u" shape by the first guide rod 33 and the second guide rod 34.

The first fastening clamp 11 and the second fastening clamp 12 may fix one side and the other side of the flexible substrate 50. As one side and the other side of a flexible substrate 50 that is bent along the first guide rod 33 and the second guide rod 34 are fixed to the first fastening clamp 11 and the second fastening clamp 12, the flexible substrate 50 that is bent by the first and second guide rods 33 and 34 may be kept in a bent state. If the flexible substrate 50 is kept in the bent state, a first bending region b1 may be defined as a portion where the flexible substrate 50 and the first guide rod 33 come in contact with each other, and a second bending region b2 may be defined as a portion where the flexible substrate 50 and the second guide rod 34 come in contact with each other.

The first fastening clamp 11 and the second fastening clamp 12 may be arranged to face each other. In an example embodiment, an extension of one side of the flexible substrate 50 that is fastened by the first fastening clamp 11 may be substantially in parallel with an extension of the other side of the flexible substrate 50 that is fastened by the second fastening clamp 12.

In the case where the first bending region b1 and the second bending region b2 are defined as a portion where the flexible substrate 50, the first guide rod 33 and the second guide rod 34 come in contact with each other, four imaginary bending lines L3, L4, L5, and L6 (shown in dashed lines) for dividing a flat region, the first bending region b1, and the second bending region b2 may be defined. For convenience of explanation, a bending line that is on one side of the first bending region b1 is referred to as a third bending line L3, a bending line that is on the other side of the first bending region b1 is referred to as a fourth bending line L4, a bending line that is on one side of the second bending region b2 is referred to as a fifth bending line L5, and a bending line that is on the other side of the second bending region b2 is referred to as a sixth bending line L6.

Further, an initial state means a state where a fourth distance d4 extending from one side of the flexible substrate 50 to the third bending line L3 is equal to a fifth distance d5 extending from the other side of the flexible substrate 50 to the sixth bending line L6. Further, a distance between the fourth bending line L4 and the fifth bending line L5 is referred to as a sixth distance d6.

If the first fastening clamp 11 or the second fastening clamp 12 moves from the initial state, the first bending region b1 and the second bending region b2 may be shifted. For example, if the first fastening clamp 11 moves in a direction in which the first fastening clamp 11 moves away from the first guide rod 33, the fourth distance d4 extending from one side of the flexible substrate 50 to the third bending line L3 may increase, and the sixth distance d6 extending from the other side of the flexible substrate 50 to the sixth bending line L6 may decrease. However, the sum of the fourth distance d4, the fifth distance d5, and the sixth distance d6 may be kept constant. Further, even in the case where the first bending region b1 and the second bending region b2 are shifted, the area of the first bending region b1 and the second bending region b2 of the flexible substrate 50 may be kept constant.

In the foregoing description, it is exemplified that the first fastening clamp 11 moves in the direction in which the first fastening clamp 11 moves away from the first guide rod 33 and the second fastening clamp 12 moves in the direction in which the second fastening clamp 12 comes close to the second guide rod 34. However, the second fastening clamp 12 may move in the direction in which the second fastening clamp 12 moves away from the second guide rod 34 and the first fastening clamp 11 may move in the direction in which the first fastening clamp 11 comes close to the first guide rod 33. In this case, the fourth distance d4 may decrease and the sixth distance d6 may increase.

Figure 12:
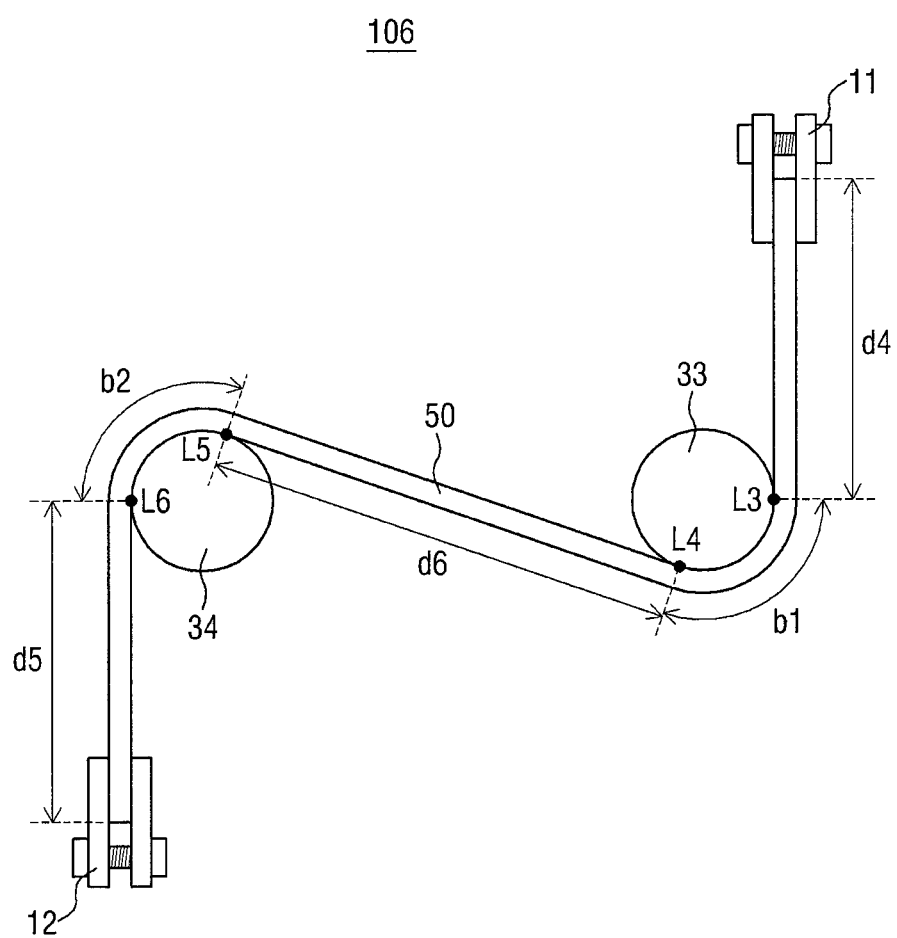
FIGS. 12 and 13 are cross-sectional views of a bending apparatus, according to another example embodiment of the present invention.
Figure 13:
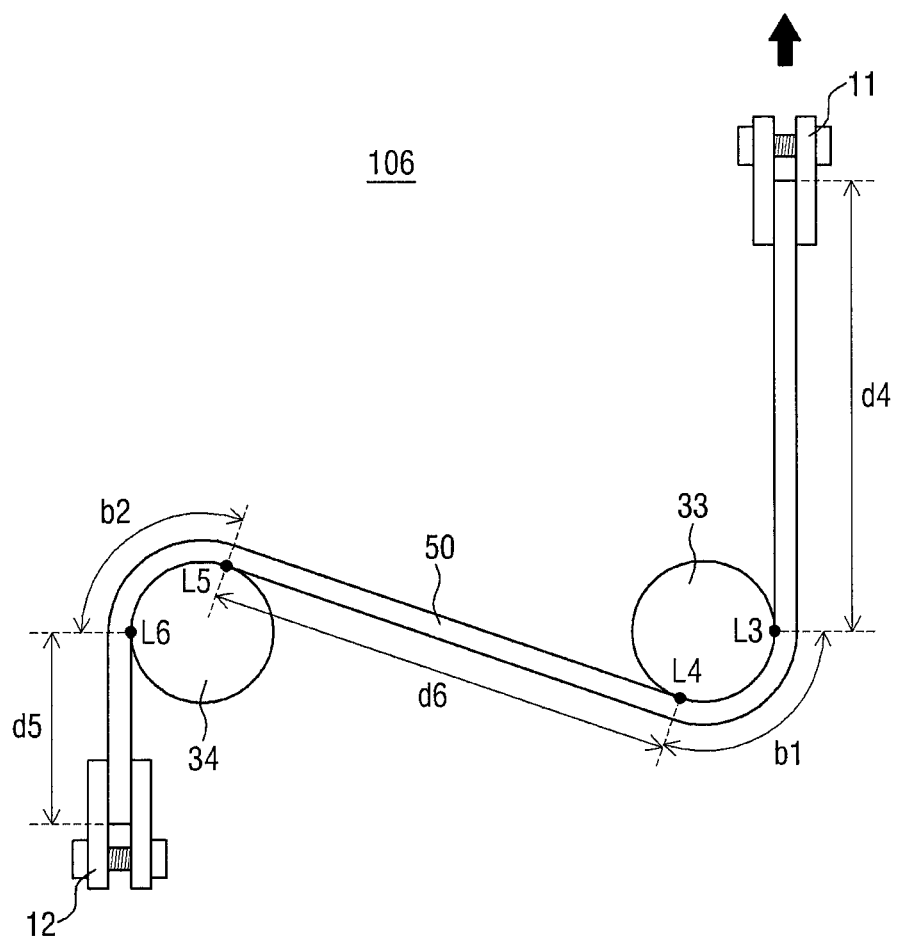

FIGS. 12 and 13 are cross-sectional views of a bending apparatus according to another embodiment of the present invention.

Referring to FIGS. 12 and 13, a bending apparatus 106 according to this embodiment of the present invention is different from the bending apparatus according to the embodiment of FIG. 10 on the point that the flexible substrate 50 is bent in an "s" shape by the first guide rod 33 and the second guide rod 34.

The flexible substrate 50 may be bent in the "s" shape by the two guide rods 33 and 34. To bend the flexible substrate 50 in the "s" shape, one surface of the flexible substrate 50 may come in contact with the first guide rod 33, and the other surface of the flexible substrate 50 may come in contact with the second guide rod 34.

The first fastening clamp 11 and the second fastening clamp 12 may fix one side and the other side of the flexible substrate 50. As one side and the other side of a flexible substrate 50 that is bent along the first guide rod 33 and the second guide rod 34 are fixed to the first fastening clamp 11 and the second fastening clamp 12, the flexible substrate 50 that is bent by the first and second guide rods 33 and 34 may be kept in a bent state. If the flexible substrate 50 is kept in the bent state, a first bending region b1 may be defined as a portion where the flexible substrate 50 and the first guide rod 33 come in contact with each other, and a second bending region b2 may be defined as a portion where the flexible substrate 50 and the second guide rod 34 come in contact with each other.

In the case where the first bending region b1 and the second bending region b2 are defined as a portion where the flexible substrate 50, the first guide rod 33 and the second guide rod 34 come in contact with each other, four bending lines for dividing a flat region, the first bending region b1, and the second bending region b2 may be defined. For convenience of explanation, a bending line that is on one side of the first bending region b1 is referred to as a third bending line L3, a bending line that is on the other side of the first bending region b1 is referred to as a fourth bending line L4, a bending line that is on one side of the second bending region b2 is referred to as a fifth bending line L5, and a bending line that is on the other side of the second bending region b2 is referred to as a sixth bending line L6.

Further, an initial state means a state where a fourth distance d4 extending from one side of the flexible substrate 50 to the third bending line L3 is equal to a fifth distance d5 extending from the other side of the flexible substrate 50 to the sixth bending line L6. Further, a distance between the fourth bending line L4 and the fifth bending line L5 is referred to as a sixth distance d6.

If the first fastening clamp 11 or the second fastening clamp 12 moves from the initial state, the first bending region b1 and the second bending region b2 may be shifted. For example, if the first fastening clamp 11 moves in a direction in which the first fastening clamp 11 moves away from the first guide rod 33, the fourth distance d4 extending from one side of the flexible substrate 50 to the third bending line L3 may increase, and the sixth distance d6 extending from the other side of the flexible substrate 50 to the sixth bending line L6 may decrease. However, the sum of the fourth distance d4, the fifth distance d5, and the sixth distance d6 may be kept constant. Further, even in the case where the first bending region b1 and the second bending region b2 are shifted, the area of the first bending region b1 and the second bending region b2 of the flexible substrate 50 may be kept constant.

In the foregoing description, it is exemplified that the first fastening clamp 11 moves in the direction in which the first fastening clamp 11 moves away from the first guide rod 33 and the second fastening clamp 12 moves in the direction in which the second fastening clamp 12 comes close to the second guide rod 34. However, the second fastening clamp 12 may move in the direction in which the second fastening clamp 12 moves away from the second guide rod 34 and the first fastening clamp 11 may move in the direction in which the first fastening clamp 11 comes close to the first guide rod 33. In this example, the fourth distance d4 may decrease and the sixth distance d6 may increase.

Hereinafter, a bending method, according to an embodiment of the present invention, will be described.

A bending method, according to an embodiment of the present, invention includes positioning a flexible substrate 50 in close contact with a guide portion 30 that guides bending of the flexible substrate 50, fastening one side and the other side of the flexible substrate 50 that is bent along the guide portion 30 to a first fastening portion 10 and a second fastening portion 20, and moving the first fastening portion 10 or the second fastening portion 20.

The bending method, according to an embodiment of the present invention, may be performed by the bending apparatus, according to some embodiments of the present invention, as described above. Further, the operation of the respective constituent elements in the bending method, according to an embodiment of the present invention, may be substantially the same as the operation of the respective constituent elements of the bending apparatus, according to some embodiments of the present invention, as described above.

The guide portion 30, the flexible substrate 50, the first fastening portion 10, and the second fastening portion 20 may be substantially the same as those of the bending apparatus, according to some embodiments, as described above, and thus the detailed explanation thereof will not be repeated.

The movement of the first fastening portion 10 and the second fastening portion 20 may be performed by a driving portion 40. The driving portion 40 may be substantially the same as that of the bending apparatus, according to some embodiments, as described above.

The arranging the guide portion 30 that guides the bending of the flexible substrate 50 on one surface of the flexible substrate 50 may include positioning the flexible substrate 50 in close contact with the guide portion 30 that includes guide rods. In an example embodiment, the guide rod may have a cylindrical shape. If the flexible substrate 50 comes in close contact with the guide having the cylindrical shape, the flexible substrate 50 may be bent along the curved surface of the guide rod.

Then, one side and the other side of the flexible substrate 50 that is bent along the guide portion 30 may be fastened to the first fastening portion 10 and the second fastening portion 20. As the one side and the other side of the flexible substrate 50 that is bent along the guide portion 30 are fixed to the first fastening portion 10 and the second fastening portion 20, the flexible substrate 50 that is bent by the guide portion 30 may be kept in a bent state. If the flexible substrate 50 is kept in the bent state, the bending region of the flexible substrate 50 may be defined as a portion where the flexible substrate 50 and the guide portion 30 come in contact with each other.

The first fastening portion 10 and the second fastening portion 20 may perform perspective motion based on (e.g., around) the guide portion 30. Therefore, if the first fastening portion 10 that fastens one side of the flexible substrate 50 moves, the second fastening portion 20 that fastens the other side of the flexible substrate 50 may also move accordingly. For example, if the first fastening portion 10 moves away from the guide portion 30, the second fastening portion 20 comes close to the guide portion 30, while if the first fastening portion 10 comes close to the guide portion 30, the second fastening portion 20 moves away from the guide portion 30.

As the first fastening portion 10 or the second fastening portion 20 moves, the bending region of the flexible substrate 50 may be shifted. However, even where the bending region is shifted through the movement of the first fastening portion 10 or the second fastening portion 20 as described above, the area of the bending region may be kept constant.

The perspective motion of the first fastening portion 10 or the second fastening portion 20 may be intermittent or continuous, and may be repeatedly performed at least once.

Although example embodiments of the present invention have been described for illustrative purposes, those skilled in the art will appreciate that various suitable modifications, additions, and substitutions are possible, without departing from the scope and spirit of the invention as defined in the accompanying claims and equivalents thereof.

What is claimed is:

1. A bending apparatus comprising:
   a guide portion configured to rotate and to guide a movement and a bending of a flexible substrate so that the flexible substrate is bent and moved, the flexible substrate bending around the guide portion;
   a first fastening portion configured to fix one side of the flexible substrate that is bent along the guide portion;
   a second fastening portion configured to fix an other side of the flexible substrate; and
   a driving portion configured to move at least one of the first fastening portion and the second fastening portion to move the flexible substrate back and forth along the guide portion.

2. The bending apparatus of claim 1, wherein the guide portion comprises a cylindrical guide rod, and the flexible substrate is bent to be in contact with the guide rod.

3. The bending apparatus of claim 1, wherein a bending region is formed on the flexible substrate as the one side and the other side of the flexible substrate fastened to the first fastening portion and the second fastening portion, respectively, is bent along the guide portion comprising a cylindrical guide rod.

4. The bending apparatus of claim 3, wherein the bending region comprises a first bending line on one side of the bending region and a second bending line on the other side of the bending region, wherein a sum of a first distance extending from the one side of the flexible substrate to the first bending line and a second distance extending from the other side of the flexible substrate to the second bending line is constant.

5. The bending apparatus of claim 4, wherein the first distance and the second distance are configured to have a same initial state, and in the initial state, a third distance extending from the one side of the flexible substrate to the other side of the flexible substrate is equal to a diameter of the guide rod.

6. The bending apparatus of claim 4, wherein the first distance and the second distance are configured to have a same initial state, and in the initial state, a third distance extending from the one side of the flexible substrate to the other side of the flexible substrate is larger than a diameter of the guide rod.

7. The bending apparatus of claim 4, wherein the first distance and the second distance are configured to have a same initial state, and in the initial state, a third distance extending from the one side of the flexible substrate to the other side of the flexible substrate is smaller than a diameter of the guide rod.

8. The bending apparatus of claim 3, wherein the bending region of the flexible substrate is shifted as the first fastening portion or the second fastening portion is moved by the driving portion.

9. The bending apparatus of claim 8, wherein a first guide rod and a second guide rod are configured to rotate as the first fastening portion or the second fastening portion moves.

10. The bending apparatus of claim 1, wherein the flexible substrate comprises an active region and a dummy region that is arranged along a circumference of the active region, and the first fastening portion and the second fastening portion are fastened to the flexible substrate at the dummy region.

11. The bending apparatus of claim 1, wherein the guide portion comprises a first guide rod and a second guide rod, each having a cylindrical shape, and wherein the flexible substrate is bent to be in at least partial contact with the first guide rod and the second guide rod.

12. The bending apparatus of claim 11, wherein the flexible substrate is bent in a "u" shape by the first guide rod and the second guide rod.

13. The bending apparatus of claim 11, wherein the flexible substrate is bent in a "s" shape by the first guide rod and the second guide rod.

14. The bending apparatus of claim 11, wherein a first bending region is formed in a portion where the flexible substrate and the first guide rod are in contact with each other and a second bending region is formed in a portion where the flexible substrate and the second guide rod are in contact with each other as the one side and the other side of the flexible substrate that is bent along the first guide rod and the second guide rod are configured to be fastened to the first fastening portion and the second fastening portion.

15. The bending apparatus of claim 14, wherein the first bending region and the second bending region are shifted as the first fastening portion or the second fastening portion is moved by the driving portion.

16. A bending apparatus comprising:
a cylindrical guide rod configured to rotate and to guide a movement and a bending of a flexible substrate so that the flexible substrate is bent and moved, the flexible substrate bending around the cylindrical guide rod;
a first fastening clamp spaced apart from the cylindrical guide rod and configured to perform perspective motion around the guide rod; and
a second fastening clamp spaced apart from the guide rod and configured to perform perspective motion around the guide rod,
wherein the first fastening clamp and the second fastening clamp are arranged to face each other, and the first fastening clamp and the second fastening clamp are configured to move in association with each other.

* * * * *